US006802044B2

(12) United States Patent
Campbell et al.

(10) Patent No.: US 6,802,044 B2
(45) Date of Patent: Oct. 5, 2004

(54) SYSTEM AND METHOD FOR DESIGNING DIVERSE COMMUNICATIONS CIRCUITS

(75) Inventors: David C. Campbell, Allen, TX (US); Mary Kim Westervelt, Plano, TX (US)

(73) Assignee: Metasolve Software, Inc., Plano, TX (US)

( * ) Notice: Subject to any disclaimer, the term of this patent is extended or adjusted under 35 U.S.C. 154(b) by 744 days.

(21) Appl. No.: 09/736,903

(22) Filed: Dec. 13, 2000

(65) Prior Publication Data

US 2002/0073382 A1 Jun. 13, 2002

Related U.S. Application Data

(60) Provisional application No. 60/232,238, filed on Sep. 13, 2000.

(51) Int. Cl.[7] .................. G06F 17/50; G06F 15/177; G06F 15/173; G08C 15/50; G08C 19/30
(52) U.S. Cl. .................. 716/2; 716/2; 716/3; 716/5; 716/7; 370/236; 370/254; 709/220; 709/225; 709/229; 713/100
(58) Field of Search ............. 716/2, 3, 5, 7; 370/236, 254; 709/220, 225, 229; 713/100

(56) References Cited

U.S. PATENT DOCUMENTS

| 5,095,480 | A | 3/1992 | Fenner ................. 370/94.1 |
|---|---|---|---|
| 5,615,254 | A | 3/1997 | Qiu et al. .............. 379/221 |
| 5,862,344 | A | 1/1999 | Hart ................. 395/200.68 |
| 5,881,048 | A | 3/1999 | Croslin ................. 370/228 |
| 5,923,659 | A | 7/1999 | Curry et al. ............ 370/401 |
| 6,091,720 | A | 7/2000 | Bedard et al. .......... 370/351 |
| 6,131,124 | A | 10/2000 | Nakatsugawa ........... 709/245 |
| 6,169,515 | B1 | 1/2001 | Mannings et al. ...... 342/357.1 |
| 6,330,250 | B1 | 12/2001 | Curry et al. ............ 370/467 |
| 6,381,647 | B1 | 4/2002 | Darnell et al. .......... 709/232 |
| 6,397,040 | B1 | 5/2002 | Titmuss et al. ......... 455/67.1 |
| 6,477,526 | B2 | 11/2002 | Hayashi et al. ............ 707/4 |
| 6,636,892 | B1 * | 10/2003 | Philyaw ................. 709/217 |
| 6,651,228 | B1 * | 11/2003 | Narain et al. ............. 716/5 |
| 2003/0126195 | A1 * | 7/2003 | Reynolds et al. ........ 709/203 |
| 2003/0126200 | A1 * | 7/2003 | Wolff .................. 709/203 |

FOREIGN PATENT DOCUMENTS

| WO | WO 98/24244 | 6/1998 | ........... H04Q/3/00 |
|---|---|---|---|
| WO | WO 00/33519 | 6/2000 | ........... H04L/12/56 |

OTHER PUBLICATIONS

Jereb et al., "PLANET: a tool for telecommunication network", IEEE Journal on Selected Areas in Communications, vol. 12, No. 7, Sep. 1994, pp. 1261–1272.*
A.F. Jones, "Integration of Independently Designed Military Communication Systems," IRE Transactions on Communications Systems, pp. 312–316, Sep. (Received by the PGCS, Dec. 23, 1960).
International Search Report in International Application No. PCT/US 01/28851, dated Mar. 6, 2002, 6 pages.

(List continued on next page.)

Primary Examiner—A. M. Thompson
Assistant Examiner—Phallaka Kik
(74) Attorney, Agent, or Firm—Baker Botts L.L.P.

(57) ABSTRACT

A system (10) for designing diverse communications circuits (36) includes a diversity set (14) identifying at least one circuit (36) that is to be diverse from one or more other circuits (36) in the diversity set (14). The system (10) further includes one or more diversity rules (16) applicable to one or more circuits (36) belonging to the diversity set (14). A diversity engine (12) validates the assignment of at least one circuit element to a circuit (36) in the diversity set (14), according to the diversity rules (16), such that the circuit (36) is diverse from at least one other circuit (36) in the diversity set (14) with respect to that circuit element. The diversity engine (12) may generate one or more diversity violations (18) if the assignment of the circuit element fails to comply with the diversity rules (16) and may associate the diversity violations (18) with the circuit (36) and its diversity set (14) to indicate a possible need to modify the assignment.

42 Claims, 4 Drawing Sheets

OTHER PUBLICATIONS

Declaration of David C. Campbell, executed May 5, 2001 with attached Solution Proposal, 25 total pages (including attachment).

Declaration of Michael R. Higgins, executed May 4, 2001 with attached Solution Proposal, 25 total pages (including attachment).

* cited by examiner

SYSTEM AND METHOD FOR DESIGNING DIVERSE COMMUNICATIONS CIRCUITS

CROSS REFERENCE TO RELATED APPLICATIONS

This application claims the benefit under 35 U.S.C. § 119(e) of U.S. Provisional Application Ser. No. 60/232,238, filed on Sep. 13, 2000.

This application is related to U.S. application Ser. No. 09/736,902 entitled "System and Method for Automatically Designing Communications Circuits" now U.S. Pat. No. 6,643,837 and U.S. application Ser. No. 09/736,693 entitled "System and Method for Automatically Designing Communications Circuits," both filed Dec. 13, 2000 by David C. Campbell, Brenda D. Dunn, Mark W. McGuire, Joseph A. Peterson, John P. Reilly, Mary Kim Westervelt.

TECHNICAL FIELD OF THE INVENTION

This invention relates in general to communications and more particularly to a system and method for designing diverse communications circuits.

BACKGROUND OF THE INVENTION

Diverse routing entails the prevention of common points of failure within a network or, in cases where this is not entirely possible, identification and tracking of points of non-compliance. Without adherence to diversity requirements during the design of circuits, a network may be vulnerable to outages and other conditions that might affect the quality and availability of communications services delivered using the network. As an example, addressing the need for diversity with respect to the Signaling System No. 7 (SS7) signaling links within the public switched telephone network (PSTN), Network Operations Forum asserts in *Installation & Maintenance Responsibilities SS7 Link and Trunk Installation and Maintenance Access Service* that SS7 link diversity "is essential to ensure the robustness" of the PSTN and a "lack of diversity on SS7 routes places the entire telecommunications network at risk." SS7 links and other circuits in the PSTN have become increasingly critical as long term local number portability (LNP) and other more advanced communications services continue to become available. Even more importantly, lack of diversity with respect to "911" or other dedicated emergency services circuits may literally place lives at risk. In many situations redundancy, although costly, may be essentially worthless without the simultaneous presence of diversity.

Diversity requirements may necessitate the assignment to diverse circuits of separate facilities (e.g., different OC48 links), diverse aspects of the physical plant underlying facilities (e.g., different cable conduits), diverse equipment (e.g., different shelves), diverse electronic components (e.g., different power sources), or any other diverse circuit elements. Through assignment separation between diverse circuits, common points of failure are reduced. However, previous techniques for manually designing circuits have been inadequate to ensure compliance with these diversity requirements or, where such compliance is impossible or impracticable, to identify and flag diversity violations for possible remediation. These inadequacies may be exacerbated if the circuit is re-designed, the circuit requires maintenance that affects its assignments, or new circuit elements become available for assignment, yet the original diversity requirements still apply. Becoming promptly aware of and then properly balancing the many perhaps competing considerations relating to diversity requirements, throughout the life cycle of the diverse circuit, may be a daunting or even impossible task for the personnel associated with the network provider. As a result, previous techniques requiring manual diversity validation are inherently less reliable than many network providers would prefer, given the very high economic stakes. Such techniques are also relatively slow, inefficient, and therefore costly to network providers. As network providers seek to respond more rapidly to an ever expanding demand for circuits, these and other problems have become increasingly significant, making previous techniques for diverse circuit design inadequate for the needs of many network providers.

SUMMARY OF THE INVENTION

According to the present invention, disadvantages and problems associated with prior techniques for designing diverse communications circuits are reduced or eliminated.

In one embodiment of the present invention, a system for designing diverse communications circuits includes a diversity set identifying at least one circuit that is to be diverse from one or more other circuits in the diversity set. The system further includes one or more diversity rules applicable to two or more circuits belonging to the diversity set. A diversity engine validates the assignment of at least one circuit element to a circuit in the diversity set, according to the diversity rules, such that the circuit is diverse from at least one other circuit in the diversity set with respect to the circuit element. In a more particular embodiment, the circuit element is a member of a hierarchy and the diversity engine validates the assignment of the circuit element according to its position in the hierarchy and a position in the hierarchy at which a common point of failure is shared between the circuit element and another circuit element. The diversity engine may generate one or more diversity violations if the assignment of the circuit element fails to comply with the diversity rules and may associate the diversity violations with the circuit and its diversity set to indicate a possible need to modify the assignment.

The present invention provides a number of important technical advantages. Through the definition and application of diversity sets and diversity rules, and the resulting generation of diversity violations, the present invention allows the network provider to identify and enforce diversity requirements, preferably automatically, at any suitable point during the life cycle of a diverse circuit. Whether during initial circuit design, during re-design of the circuit, in connection with maintenance that affects circuit elements assigned to the circuit, or in response to availability of new circuit elements, the present invention helps network providers more efficiently and reliability protect their most vital resources—their networks—against the outages or other undesirable conditions that may result from common points of failure. This robustness may thus help improve the quality and availability of services delivered using the networks. Systems and methods that incorporate one or more of these or other technical advantages are well suited for modern communications networks. Other technical advantages should be apparent to those skilled in the art from the following figures, descriptions, and claims.

BRIEF DESCRIPTION OF THE DRAWINGS

To provide a more complete understanding of the present invention and the features and advantages thereof, reference is now made to the following description taken in conjunction with the accompanying drawings, in which.

DETAILED DESCRIPTION OF THE INVENTION

Communications circuits connect network locations to allow communication between the network locations, perhaps through one or more intermediate locations. For example, a circuit might be a circuit connecting two end user locations; a trunk circuit connecting two switches, a Signaling System No. 7 (SS7) link connecting a Signaling Transfer Point (STP) to a Service Switching Point (SSP), another STP, or another network element such as a Service Control Point (SCP); a "911" or other emergency services circuit; a circuit encompassing nodes on a Synchronous Optical Network (SONET) ring; a permanent virtual circuit (PVC), virtual connection, or link relying on Frame Relay (FR), Asynchronous Transfer Mode (ATM), Internet Protocol (IP), or another packet-based protocol; a "bandwidth" circuit involving a physical circuit that multiple virtual circuits "ride" using portions of its available bandwidth; or any other suitable circuit. The present invention encompasses the diverse design of any appropriate circuit, in accordance with particular needs.

Figure 1:
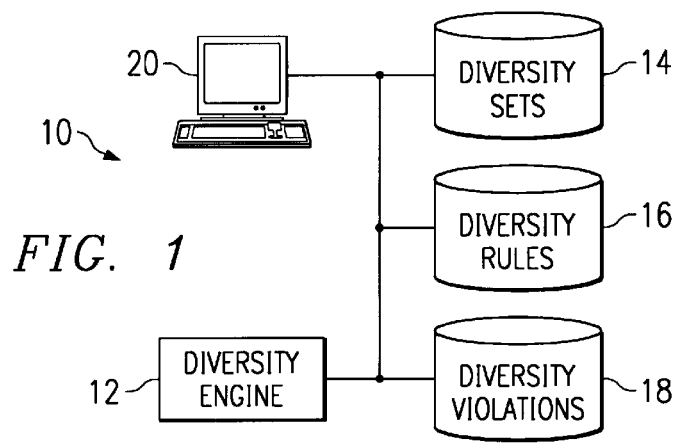
FIG. 1 illustrates an exemplary system for designing diverse circuits in a communications network.

FIG. 1 illustrates an exemplary system 10 for designing diverse circuits, meaning that assignments of one or more circuit elements to one circuit should be different than assignments to one or more other circuits that are to be diverse from that circuit. As used herein, where appropriate, the term "diversity" is intended to include "triversity," "quadversity," or any other type of diversity that involves more than two circuits. For example, four SS7 B-links are typically used to interconnect four STPs in a "quad" arrangement. Triversity describes the situation in which at least three of the four B-links are to be diverse from one another but the fourth may have one or more of the same assignments as the other three, such that at least three simultaneous and independent link failures are needed to isolate an STP from its neighbors. Analogously, quadversity describes the situation where all four B-links are to be diverse, such that four simultaneous and independent link failures will be required to isolate an STP. Those skilled in the art will appreciate that numerous other diversity scenarios may be envisioned. The present invention is intended to encompass all such scenarios.

In general, diversity may incorporate facility diversity, local loop diversity, environmental diversity, plant diversity, equipment diversity, electronic diversity, or any other suitable form of diversity, singly or in any appropriate combination. As described more fully below, facility diversity involves assignment of facilities such that a designed circuit is diverse from one or more other circuits with respect to a suitable facility hierarchy. Local loop diversity involves an assignment of facilities, central offices (COs) or other serving wire centers (SWCs), or both so that designed circuits do not have common points of failure within the local loop. Environmental diversity involves assignment such that diverse circuits are not subject to an identical set of environmental risks. Plant diversity involves checking deeper into a facility hierarchy, beyond the base facility and into the fiber, copper, or other cable providing the physical segment for the facility, such that a designed circuit is diverse from one or more other circuits as to a physical plant hierarchy. Equipment diversity involves assignment of physical equipment such that the designed circuit is diverse from one or more other circuits with respect to a suitable equipment hierarchy. Relating to equipment diversity is electronic diversity, involving diverse assignment of certain electronic components, such as power and timing sources, to further avoid common points of failure. These and other forms of diversity are described more fully below. Those skilled in the art will appreciate that the present invention encompasses all suitable forms, whether or not explicitly referenced herein.

System 10 includes diversity engine 12 that processes user-defined or other diversity sets 14 and diversity rules 16 in assigning circuit elements to circuits that have been designated as diverse. Circuits may be designated as diverse in a service order the network provider received from a customer, in response to an internally generated demand, or in any other manner. According to the present invention, a diversity set 14 is used to identify a set of two or more circuits in which at least one circuit has a diversity requirement relative to one or more other circuits in the set. However, as the above discussion of triversity and quadversity indicates, all circuits within a diversity set need not necessarily be diverse from one another. A diversity set 14 should preferably specify the type of diversity (e.g., diversity, triversity, or quadversity) that will be enforced with respect to its member circuits. Diversity set 14 may, in addition to identifying its member diverse circuits, identify one or more circuit elements to which associated diversity rules 16 apply. The circuit elements may include facilities or facility types, locations or location types, plant elements or element types, pieces of equipment or equipment types, electronic components or component types, or other appropriate circuit elements. Alternatively, it might be assumed that the circuits in diversity set 14 should be made as diverse as possible with respect to as many circuit elements as possible.

In one embodiment, before a diverse circuit may be designed, user 20 must specify one or more circuits to define one or more diversity sets 14, each having at least two member circuits. User 20 may be able to add one or more circuits to an existing diversity set 14 before, during, or after initial design of a circuit within the diversity set 14, although doing so after the initial design might require re-design of one or more circuits previously within that diversity set 14. Similarly, user 20 may delete one or more circuits from a diversity set 14 at any time, which might warrant (if not require) re-design of one or more circuits remaining in the diversity set 14. The present invention contemplates defining and re-defining diversity sets 14 at any appropriate time. Diversity engine 12 may apply one or more rules to validate the definition of a diversity set 14, for example only and without limitation, requiring a user 20 to specify diversity, triversity, or quadversity in defining a diversity set 14 containing SS7 links.

An indicator may be associated with a circuit to indicate that the circuit is a member of a diversity set 14. However, the mere presence of an indicator may not necessarily mean the circuit is diverse. For example, the circuit may be the fourth quad SS7 link in a four member diversity set 14 for which triversity, as opposed to quadversity, is necessary. Accordingly, this particular SS7 link might be excluded from diversity requirements applying to the other SS7 links in the diversity set 14. One or more circuits within a diversity set 14 may be excluded from some or all diversity rules 16 on any appropriate basis. In one embodiment, an SS7 link type attribute may be specified for each SS7 link within a diversity set 14, for example, "A" for access links, "B" for bridge links, "C" for cross links, "D" for diagonal links, "E" for extended links, and "F" for fully-associated links, thereby allowing diversity engine 12 to more readily apply diversity rules 16 appropriate to the types of SS7 links involved. As another example of a circuit within a diversity set 14 not being diverse, the circuit might simply have been designed non-diversely in spite of the requirement (in this case overridable) that the circuit be diverse. Diversity sets 14 may be defined in any suitable manner according to particular needs.

Once a diversity set 14 has been defined, diversity engine 12 may perform diversity validations according to one or more diversity rules 16 applicable to that diversity set 14. Diversity rules 16 allow the user 20 to customize the requirements surrounding the network provider's implementation of diversity, impacting facilities, physical plant elements, equipment, electronic components, or other suitable circuit elements, singly or in any suitable combination. Diversity engine 12 may perform diversity validations, applying one or more diversity rules 16, at any suitable time during the life cycle of a circuit. For example, validations may occur during initial design of the circuit, during re-design of the circuit, in connection with maintenance affecting one or more circuit elements, in response to one or more circuit elements becoming available for assignment, according to a predetermined circuit grooming schedule, or at any other appropriate time. In one embodiment, diversity engine 12 validates diversity for a circuit automatically as part of an automatic circuit design process, such as that described in copending U.S. application Ser. No. 09/736,693 for a "System and Method for Automatically Designing Communications Circuits," filed Dec. 13, 2000, which is incorporated by reference herein.

In one embodiment, in performing diversity validations, diversity engine 12 may generate diversity violations 18 when assignments to circuits fail to satisfy the associated diversity rules 16. A diversity violation 18 may result from the fact that complying assignments could not be made, that the user specified a non-complying assignment in spite of diversity rules 16, or for any other suitable reason. Diversity engine 12 might associate a diversity violation 18 with a particular diverse circuit being designed, re-designed, groomed, or otherwise manipulated. Furthermore, that diversity violation 18 might also be associated with one or more diversity sets 14 containing the circuit, with a line or other icon associated with the circuit within a graphical circuit design layout, or with any other information corresponding to the circuit. In one embodiment, association of a diversity violation 18 with a diverse circuit or corresponding information indicates that at least one assignment to the circuit violates one or more applicable diversity rules 16. Association of diversity violation 18 with a diversity set 14 indicates that at least one circuit in that diversity set 14 is in violation of one or more applicable diversity rules 16.

When a diversity violation 18 is associated with a circuit, a corresponding association may be automatically or otherwise made to the corresponding graphical icon, to the one or more diversity sets 14 containing the circuit, and to one or more other circuits in those diversity sets 14. Conversely, if a diversity violation 18 for a circuit is resolved, diversity violation 18 may be disassociated from the graphical design icon, from the diversity sets 14, and from appropriate other circuits in those diversity sets 14. When a diversity violation 18 is generated for a circuit, diversity engine 12 or another component of system 10 may generate a text or other suitable message for communication to user 20, for example, in association with the corresponding icon. Such messages might be used to warn user 20 about the presence of the diversity violation 18 and, possibly, suggest a recommended course of action for resolving it. Color, shading, movement, or any other suitable indicator may be used instead of or in addition to a text message to convey such information. For example, the circuit responsible for the diversity violation 18 might have a blinking red graphical icon, while other circuits in its diversity sets 14 might have blinking yellow icons. Such graphical circuit design functionality will preferably allow user 20 to view multiple designs simultaneously so that their assignments may be visually compared.

Graphical display may be especially advantageous with respect to design of SS7 links, and planning for associated STP locations 32, according to the available facilities, plant routes, equipment, and other appropriate considerations. In order to determine during circuit design whether the diversity requirements for an SS7 link will be met, it is often helpful to view the particular link in relation to its associated links and in the context of the entire SS7 network. For example, a graphical design capability associated with system 10 may provide desired visibility into mated STP pairs, the STP hierarchy (including relationship between regional and local STPs), various types of SCPs, link layers when there are multiple links between such SS7 elements, and any other appropriate information. Although discussed in connection with the SS7 network, graphical design capability may be provided with respect to any circuit types, according to particular needs.

User-defined or other susceptibility levels may determine whether particular users 20 are allowed to override particular diversity violations 18, providing further customization. If user 20 overrides a diversity violation 18, a log may be collected and the diversity violation 18 flagged for the particular assignment in question. This allows diversity engine 12, user 20, or both to subsequently access the log, determine that one or more diversity violations 18 exist, and possibly attempt to resolve these diversity violations 18 as appropriate. This log will preferably identify a particular user 20 as having overridden the diversity violation 18. Depending on its type and severity, diversity engine 12 may communicate the diversity violation 18 to one or more other persons or components of system 10, in addition to user 20, that may be associated with the network provider. In order to override a diversity violation 18, user 20 might be required to provide a proposal for reconciling it and the date on which the reconciliation is expected to take place.

Diversity engine 12 may operate on one or more computer systems at one or more locations. Diversity sets 14, diversity rules 16, and diversity violations 18 may be stored in the same or different databases at one or more locations integral to or separate from the computer systems supporting diversity engine 12. User 20 may include one or more computer systems, one or more persons associated with these computer systems, or both. Diversity engine 12 and user 20 may communicate with one another, and with databases supporting diversity sets 14, diversity rules, and diversity violations 18, using one or more local area networks (LANs), metropolitan area networks (MANs), wide area networks (WANs), a global network such as the Internet, or any other appropriate network or networks.

Selected types of diversity and associated diversity rules 16 are described in more detail below. Although a variety of exemplary diversity rules 16 and scenarios are described, the present invention is meant to encompass all appropriate diversity rules 16 and scenarios, whether or not specifically referenced herein.

Facility and Related Diversity

Figure 2:
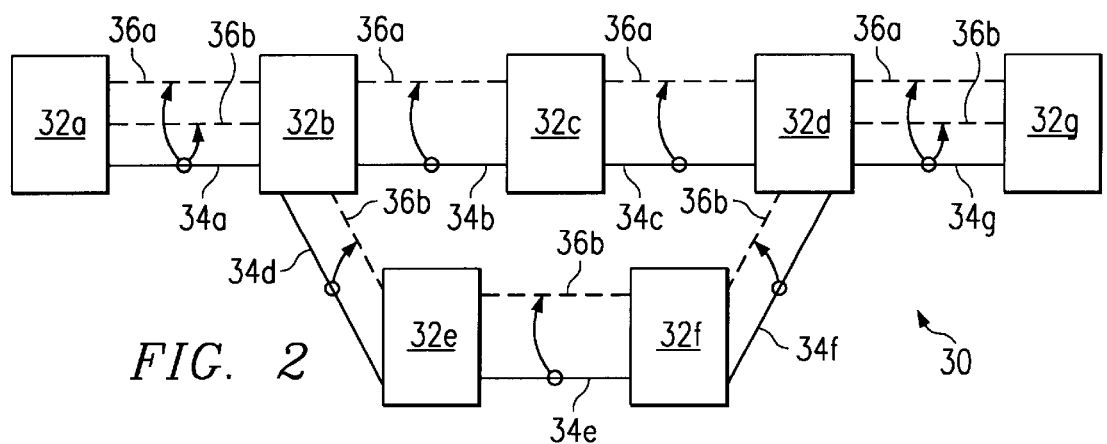
FIG. 2 illustrates exemplary diverse circuits.

A facility physically connects two circuit locations such that communication can occur between the locations at a transmission rate associated with that facility. FIG. 2 illustrates an exemplary portion 30 of a network including locations 32 connected using facilities 34. In this example, locations 32 include first and second end user locations 32a and 32g, respectively; first and second CO or other suitable SWC locations 32b and 32d, respectively, and tandem offices or other intermediate locations 32c, 32e, and 32f. If two circuits 36a and 36b between end user locations 32a and 32g have been placed in a diversity set 14, facilities 34 should be assigned to these circuits 36, if possible, such that their physical paths do not overlap or, if this is not possible, such that their overlap is minimized. Thus, in this example, facilities 34a and 34g must each be assigned to both circuits 36a and 36b—there are no other facilities 34 available to provide diversity within the local loop. However, between SWC locations 32 diversity may be attained through assignment of facilities 34b and 34c to circuit 36a and assignment of facilities 34d, 34e, and 34f to circuit 36b. As readily seen from FIG. 2, there are no common points of failure between the SWC locations 32 from a facility perspective—if a single facility 34 between SWC locations 32 fails, communications between SWC locations 32 could still continue operations using the other facility 34.

Figure 3A:
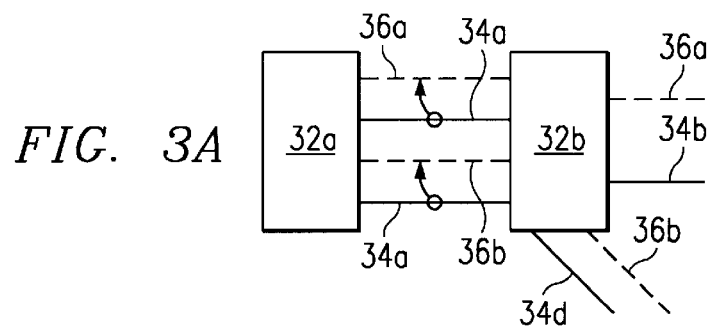
FIGS. 3A and 3B illustrate exemplary local loop diversity.
Figure 3B:
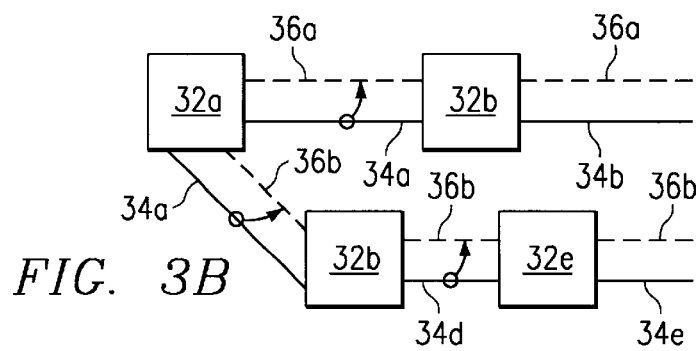

A lack of diversity with respect to the local loop coupling, for example, end user location 32a to associated SWC location 32b is generally undesirable but quite expensive to remediate. As illustrated in FIG. 3A, multiple facilities 34a may be provided between the end user location 32a and SWC location 32b, such that each circuit 36a and 36b may be assigned its own facility 34a over the local loop. If a similar arrangement existed over the local loop between end user location 32g and SWC location 32d, facility diversity for circuits 36a and 36b may be complete over their entirety. However, since both circuits 36a and 36b would still share the same SWC locations 32b and 32d, undesirable common points of failure are still present. As shown in FIG. 3B, multiple SWC locations 32b may be provided to serve an end user location 32a, each SWC location 32b having an associated facility 34a, to eliminate the common point of failure present at SWC location 32b. If a similar arrangement existed for SWC location 32d, there would exist substantial local loop diversity between circuits 36a and 36b. This diversity often comes at a high price, since the network provider must utilize additional SWC locations 32 and additional facilities 34.

Although SWC location 32 is primarily described, diversity rules 16 may be used to identify an STP or any other appropriate location 32 having a relatively high risk of isolation due to a lack of alternative facilities coupling the particular location 32 to other locations 32 in the network. For example, diversity rules 16 may specify that two SS7 links in a link pair be acquired from different interexchange carriers (IXCs) having different Access Customer Terminal Locations (ACTLs) 32 or other point of interface (POI) locations 32 within the Local Access and Transport Area (LATA). If both links needed to be acquired from one IXC, the diversity rules 16 might specify that the IXC at least have geographically separated POI locations 32 within that LATA. Such diversity rules 16 might be supported through verification that two circuits 36 in the same diversity set 14 do not have the same 8-byte or 11-byte CLLI code for their POI locations 32. Any suitable location-related diversity rules 16 may be defined according to particular needs.

Figures 4, 5:
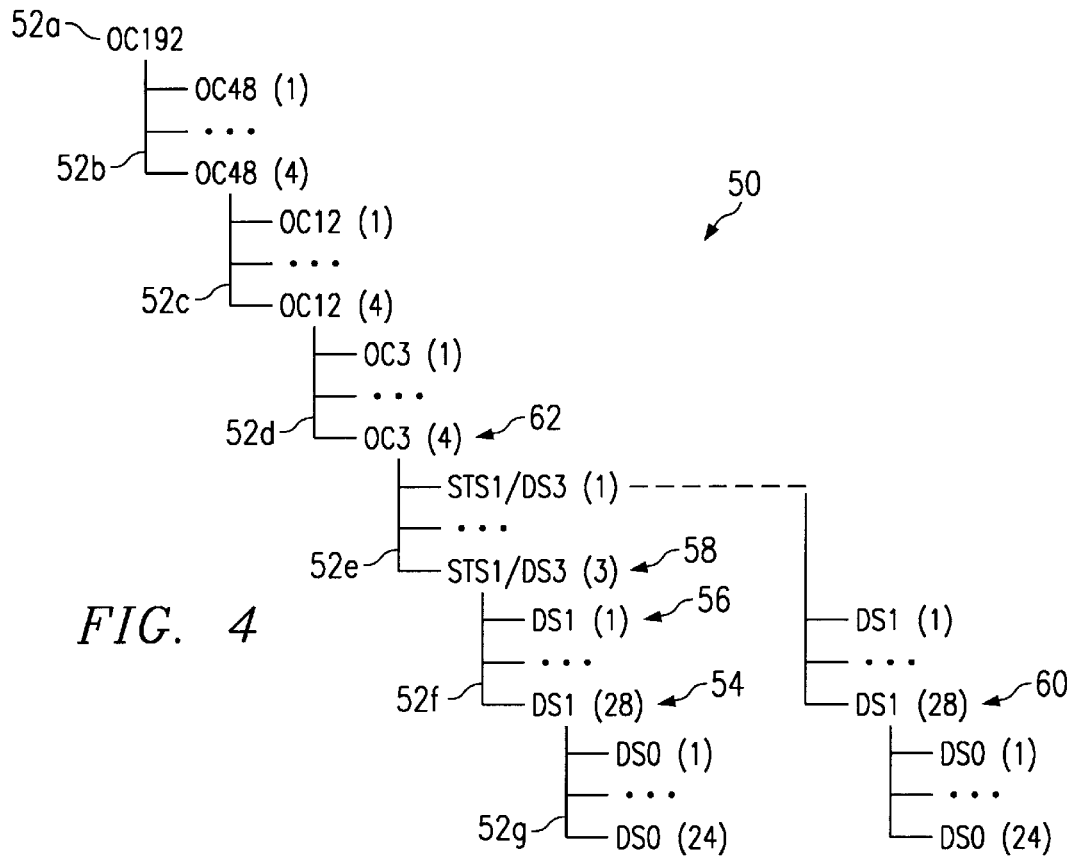
FIG. 4 illustrates an exemplary facility hierarchy.
FIG. 5 illustrates an exemplary table identifying susceptibility levels.

Facilities 34 may correspond to positions in a facility hierarchy, where each position has a corresponding transmission rate. FIG. 4 illustrates an exemplary facility hierarchy 50 having multiple levels 52. This particular facility hierarchy 50 begins at OC192 level 52a and continues through OC48 level 52b, OC12 level 52c, OC3 level 52d, STS1/DS3 level 52e, DS1 level 52f, and DS0 level 52g. While a particular facility hierarchy 50 is described, the present invention contemplates any appropriate facility hierarchy 50 according to particular needs. Although terms for standard North American facilities are used, the present invention contemplates any suitable facilities and terminology. In some cases, two diverse circuits 36 may be assigned different facilities 34 at a particular level 52 within facility hierarchy 50, therefore being diverse with respect to the particular level 52. However, although diverse with respect to facilities 34 at the particular level 52, these circuits 36 might share facilities 34 at one or more higher levels 52, such that common points of failure still exist. In one embodiment, user 20 may specify susceptibility levels for situations involving facility overlaps. In general, the lower the level 52 at which the overlap occurs within facility hierarchy 50, the more susceptible the diverse circuit pair is to failure.

For example, first circuit 36 might be assigned first DS1 facility 34 (arrow 56), while second circuit 36 may be assigned twenty-eighth DS1 facility 34 (arrow 54). As shown in FIG. 4, although these circuits 36 are assigned different DS1 facilities 34 and are thus diverse at level 52f, these circuits 36 share an STS1/DS3 facility 34 at level 52e and thus share a common point of failure. If the STS1/DS3 facility 34 were to suffer an outage, both circuits 36 would go down. As a result, a user 20 might assign a high susceptibility level to these facility assignments. As an alternative example, first circuit 36 might be assigned the same first DS1 facility 34 (arrow 56), while second circuit 36 may be assigned a different twenty-eighth DS1 facility 34 (arrow 60) than in the previous example. As before, the circuits 36 are assigned different DS1 facilities 34 and are thus diverse at level 52f. They are also diverse at level 52e since they do not share an STS1/DS3 facility 34. Although they do share an OC3 facility 34 in level 52d (arrow 62), and thus have a common point of failure, this common point of failure occurs at a higher level 52 within the facility hierarchy 50. As a result, user 20 might assign a lower susceptibility level to these facility assignments to reflect their lower likelihood of simultaneous failure.

In one embodiment, when a facility 34 is assigned to a diverse circuit 36, a diverse rider indicator may be associated with facility 34. In response, the facility hierarchy 50 may be traversed and a corresponding indicator associated with those higher level facilities 34 that are parents to the assigned facility 34. As a result, the diversity engine 12 may avoid assigning, to a second diverse circuit 36 in the same diversity set 14, a facility 34 with the same parent as the facility 34 assigned to the first diverse circuit 36. The indicator associated with the parent facility 34 might explicitly identify the first diverse circuit 36 or might simply provide an appropriate warning that further investigation is needed before assigning a facility 34 with that parent to the second diverse circuit 36.

In one embodiment, user 20 may define diversity rules 16 according to the susceptibility level at which a common point of failure within a facility hierarchy 50 may be allowed to exist in the design of a diverse circuit 36. For example only and not by way of limitation, FIG. 5 illustrates an exemplary table 70 indicating the susceptibility levels 72 for various facility assignments, based on a transmission rate 74 (or level 52) for circuits 36 in a diversity set 14 in light of a transmission rate 76 for the facility 34 (or level 52) that is their common point of failure (CPOF). This example indicates that when circuits 36 in a diversity set 14 are assigned the same STS1/DS3 facility 34, susceptibility level 72 may be relatively high, while for the same OC48 facility 34 susceptibility level 72 may be relatively low. Alternatively, diversity rules 16 may be based on a transmission rate 76 (or level 52) at which a common point of failure is allowed to exist, whether or not associated with a specified susceptibility level 72. Furthermore, although susceptibility levels 72 are primarily described as being user-specified, the present invention contemplates susceptibility levels 72 being specified automatically based on the number of levels separating the assigned facilities from their common point of failure or in any other appropriate manner, according to particular needs.

In one embodiment, diversity engine 12 may use susceptibility levels 72 to determine whether and to what extent particular users 20 are permitted to override diversity violations 18 during facility assignment. For example, the ability of a user 20 to override a diversity violation 18 might depend on the susceptibility level 72 associated with the diversity violation 18 and the user's security profile. A user 20 with relatively high authority might be able to override any diversity violation 18, regardless of the associated susceptibility level 72. Conversely, a user 20 with low authority might be limited to overriding only those diversity violations 18 with low susceptibility levels 72 or might be completely prevented from overriding diversity violations 18. The present invention contemplates any suitable criteria for managing the ability of user 20 to override, in whole or in part, diversity violations 18.

Diversity rules 16 may include facility type avoidance rules specifying that, when possible, assignments of particular facility types to diverse circuits 36 should always be avoided. For example only and not by way of limitation, a user 20 might choose to specify the avoidance of analog microwave systems in designing critical diverse circuits 36 due to the decreased reliability of such systems relative to land-based facilities 34. Such facility avoidance rules may have multiple degrees. For example, diversity rules 16 may specify that assignment of certain types of facilities 34 or systems to diverse circuits 36 is always prohibited, should be avoided unless absolutely necessary to design the circuits 36, or is merely one factor to consider in designing the circuits 36. Diversity rules 16 might also specify that certain facility types should not be assigned to more than one circuit 36 in a diversity set 14, such that if a circuit 36 has already been assigned such a facility type, assignment of the same type of facility 34 to another circuit 36 within the same diversity set 14 might prompt diversity engine 12 to generate a diversity violation 18.

Diversity rules 16 might specify one or more preferred, possibly prioritized, facility types. For example, a diversity rule 16 might specify that, for some types of diverse circuits 36, assignments of fiber-based (versus copper-based) facilities 34 are preferred and should be attempted first. However, any suitable criteria may be used according to particular needs. Moreover, diversity rules 16 may specify that a facility type not considered sufficiently reliable, based on the level of maintenance required by particular facilities 34 of that type or otherwise, should not be assigned to any diverse circuits 36 or to multiple circuits 36 within the same diversity set 14. The present invention contemplates any suitable diversity rules 16 to identify and enforce diversity requirements for facility and related diversity.

Plant and Related Diversity

Physical plant (sometimes referred to as "Outside Plant" (OSP)), is typically considered to include fiber, copper, or other cables and their individual fibers, pairs, or other elements. Groupings of fibers, pairs, or other such elements with the same originating locations 32, terminating locations 32, and physical characteristics are referred to as plant complements. In one embodiment, instead of or in addition to other diversity rules 16 described above, diversity engine 12 may apply appropriate diversity rules 16 relating to particular elements of the physical plant, such as plant routes, conduits, cable sheaths, cable binders, or other suitable elements, singly or in any combination. Plant diversity rules 16 may be necessary to avoid undesirable common points of failure, even if all facility diversity rules 16 have been satisfied. For example, two diverse circuits 36 may be completely diverse or may have low susceptibility assignments from a facility perspective (e.g., sharing no facilities 34 below OC192 level 52a), but may actually be carried over the same physical cable. When the cable is cut or otherwise fails, both diverse circuits 36 will be lost even though every effort was made to ensure their diversity from a facility perspective. Although assignment of microwave radio or other less reliable systems to critical circuits 36 is typically avoided, in such cases diversity validation may not go deeper than the base facilities 34 due to the lack of physical plant associated with the air interface.

Figure 6A:
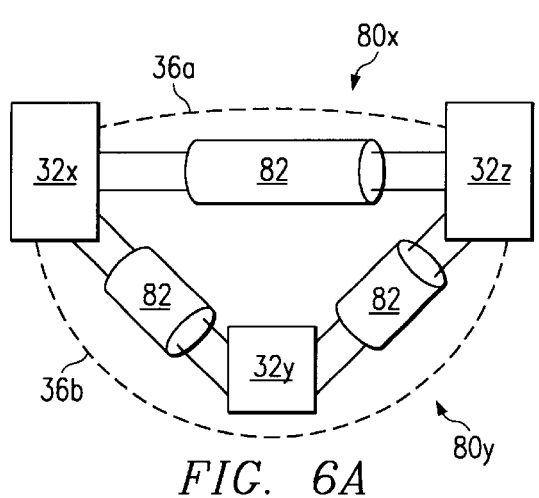
FIGS. 6A–6D illustrate exemplary plant route diversity, conduit diversity, sheath diversity, and binder diversity, respectively.

Of the types of plant diversity, plant route diversity is usually considered the most desirable. As indicated in FIG. 6A, plant routes 80 between two network locations 32 may be made completely diverse, sharing no plant aspects. As just an example, plant route 80x between locations 32x and 32z is diverse from plant route 80y. By assigning plant route 80x to circuit 36a and plant route 80y to circuit 36b, plant diversity for the circuits 36a and 36b may be ensured. As a result, if a single cable 82 is cut or otherwise fails, communications will still be supported between locations 32x and 32z. Plant routes 80 are sometimes referred to as "separations routes." Thus, plant route diversity involves the assignment of different cables and different separations routes to circuits 36 in the same diversity set 14. Although two circuits 36 are illustrated, the present invention contemplates assessing plant route diversity for any number of circuits 36 in a diversity set 14.

Figure 6B:
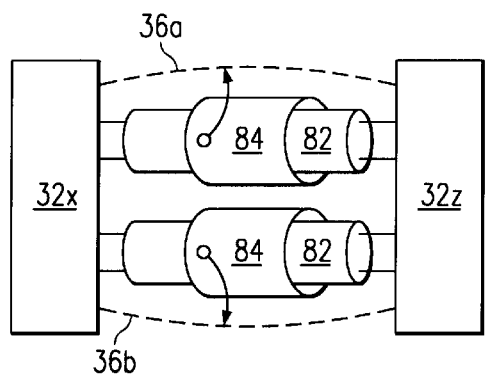

Plant route diversity might be impracticable or even impossible to achieve. Another less desirable option is conduit diversity, shown in FIG. 6B. Conduit diversity allows circuits 36 in a diversity set 14 to follow a common plant route 80, but with assignment separation through different conduits 84. The circuits 36 are considered to be at a lower risk of simultaneous failure, since they are assigned to cables 82 protected within two different conduits 84. If a single conduit 84 is cut, causing the associated diverse circuit 36 to be lost, communications may still occur between locations 32x and 32z through the other diverse circuit 36. In contrast to plant route diversity, conduit diversity involves assignment to diverse circuits 36 of different cables but the same separations route. Although only two circuits 36 are illustrated, the present invention contemplates evaluating conduit diversity for any number of circuits 36 in a diversity set 14.

Figure 6C:
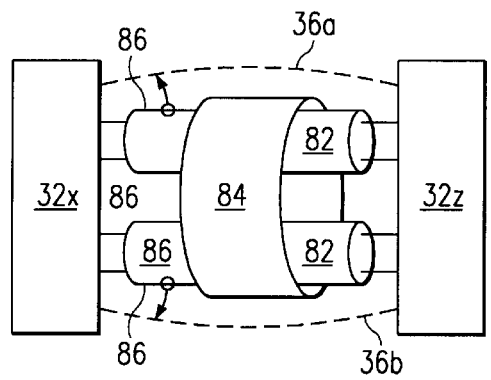

Conduit diversity may be impracticable or even impossible to achieve. The next best option is sheath diversity, shown in FIG. 6C. Sheath diversity allows circuits 36 in the same diversity set 14 to be assigned facilities 34 carried within the same conduit 84, but with assignment separation through different cable sheaths 86. It is apparent that sheath diversity poses a higher risk of simultaneous failure and is therefore less desirable than either plant route diversity or conduit diversity. If a conduit 84 is partially cut, however, the likelihood that two circuits 36 assigned to different cable sheaths 86 will be affected is not as great as if both circuits 36 share the same cable sheath 86. In contrast to plant route diversity and conduit diversity, sheath diversity involves an assignment to diverse circuits 36 of the same cable and same separations route. Although two circuits 36 are shown, the present invention contemplates evaluating sheath diversity for any number of circuits 36 in a diversity set 14.

Figure 6D:
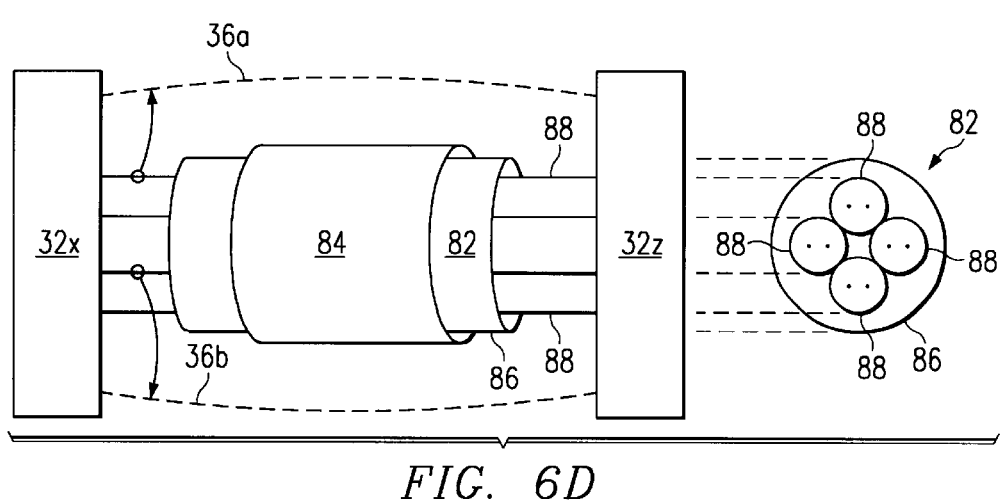

Sheath diversity may be impracticable or even impossible to achieve. The next best option is binder diversity, as illustrated in FIG. 6D. Binder diversity allows circuits 36 in the same diversity set 14 to be carried over facilities 34 in the same sheath 86, but with assignment separation through different cable binders 88. Binder diversity is a poor type of plant diversity on which to rely. However, by assigning two diverse circuits 36 to two different binders 88, the likelihood that a simultaneous failure will occur in the event of a partial cable cut may be less than if the circuits 36 were assigned the same binder 88. Like sheath diversity described above, binder diversity involves assignment to diverse circuits 36 of the same cable and same separations route. Although only two circuits 36 are shown, the present invention contemplates assessing binder diversity for any number of circuits 36 in a diversity set 14.

Figure 7:
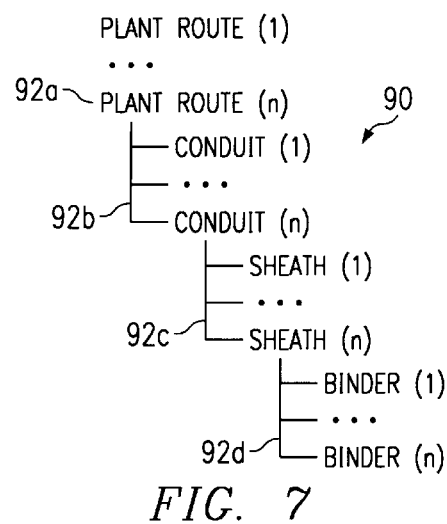
FIG. 7 illustrates an exemplary physical plant hierarchy.

The different degrees to which diversity rules 16 may specify assignment separation between diverse circuits 36 for plant elements may be formalized using a plant hierarchy 90 similar to facility hierarchy 50 described above with reference to FIG. 4. FIG. 7 illustrates an exemplary plant hierarchy 90 that includes one or more levels 92, although any appropriate plant hierarchy 90 may apply. In some cases, two diverse circuits 36 may be assigned to different plant elements within a particular level 92 in plant hierarchy 90, therefore being diverse with respect to the particular level 92. However, while diverse with respect to the plant elements at the particular level 92, these circuits 36 might share plant elements at higher levels 92, such that common points of failure still exist.

In one embodiment, similar to diverse rider indicators described above with respect to facility assignments, a diverse rider indicator might be associated with a plant element when it is assigned to a diverse circuit 36. In response, plant hierarchy 90 may be traversed and a corresponding indicator associated with those higher level plant elements that are parents to the assigned plant element. As a result, if a plant element having a parent is assigned to a first diverse circuit 36, diversity engine 12 may be able to avoid assigning another plant element having the same parent to a second diverse circuit 36 in the same diversity set 14. The indicator associated with the parent plant element may explicitly identify the first diverse circuit 36 or may simply provide an appropriate warning that further investigation is needed before assigning a plant element having that parent to the second diverse circuit 36. Similarly, diverse rider indicators might be used to avoid assigning elements at the same level 92 in plant hierarchy 90 to diverse circuits 36 in the same diversity set 14. For example, when a diverse circuit 36 is assigned a conduit of a conduit pair, the assigned conduit and its complement conduit may each receive a diverse circuit rider indicator.

Similar to facility hierarchy 50, user 20 may be able to assign susceptibility levels for situations that involve plant element overlaps. In general, the lower the level 92 at which an overlap occurs within plant hierarchy 90, the more susceptible the diverse circuit pair is to failure. Also similar to facility hierarchy 50, a suitable table or other data structure may be constructed to relate susceptibility levels to the assigned plant elements (or level 92) and the plant element (or level 92) that is the common point of failure. Although susceptibility levels are described, the present invention contemplates diversity rules 16 being based on the plant element (or level 92) at which the common point of failure may be permitted to exist in the design, whether or not it is associated with a given susceptibility level. The susceptibility levels for plant assignments may be user-specified or generated in any other suitable manner, may be used to determine whether and to what extent a particular user 20 may override a diversity violation 18, and may have other appropriate similarities to susceptibility levels described above in connection with facility diversity.

It is generally recognized that there exists an inherent common point of failure at each SWC or similar location 32. This is the region in which all the cables 82 leaving such a location 32 share the same plant route 80. For an SWC location 32, this is typically a region from the SWC location 32 to a point approximately one hundred feet away at which actual distribution of cables 82 occurs. The present invention contemplates diversity engine 12 performing suitable diversity validations with respect to this common point of failure using one or more appropriate diversity rules 16, as appropriate. Although this is described primarily with respect to SWC location 32, such diversity validations may be performed with respect to any location 32 within a diverse circuit 36.

Furthermore, a plant route 80 may include a combination of aerial cable 82, cable 82 within conduit 84, underground cable 82, or any other appropriate type of cable environment. In one embodiment, diversity rules 16 may specify that diverse circuits 36 should not be assigned the same cable environment, at least within the same general vicinity, to further reduce common points of failure. As an example, even if diverse circuits 36 were assigned facilities 34 and plant elements with low susceptibilities to failure (e.g., different OC192 facilities 34 and plant routes 80), but were assigned aerial cables 82 in the same vicinity, a tornado in that vicinity might take down all cables 82 and thus all the diverse circuits 36. However, if a tornado took down an aerial cable 82 assigned to a first diverse circuit 36, a second diverse circuit 36 assigned an underground cable 82 might remain substantially unaffected. This type of diversity may be referred to as environmental diversity.

Diversity engine 12 may support diversity validation, as it applies to plant element assignments, through the relationship between circuits 36 and the network provider's recorded plant inventory. Where the level of detail of plant inventory is insufficient to automatically implement one or more plant diversity rules 16 (e.g., sheath level inventory and below is not maintained), diversity engine 12 or another component of system 10 may generate checklists for use in manually verifying that the diversity rules 16 are satisfied or, if not, that violations are flagged for possible remediation. User 20 may be able to secure plant inventory for future assignment using a suitable reservation process. The present invention contemplates any suitable diversity rules 16 to identify and enforce diversity requirements for plant and related diversity.

Equipment and Related Diversity

Diversity engine 12 may apply diversity rules 16 in assigning to circuits 36 particular pieces of physical equipment, for example, a particular switching system within an SWC; a particular bay, rack, shelf, or other mounting apparatus within the switching system; a particular card, slot, port address, or other mounting position of the mounting apparatus; or to any other suitable pieces of equipment. A particular piece of installed equipment might always be at the same location 32 or might be moved or otherwise rearranged from time to time. Each piece of equipment may be identified in an appropriate equipment hierarchy analogous to facility hierarchy 50 and plant hierarchy 90 described above, assignments being made according to the applicable diversity rules 16, relative susceptibility levels, or any other criteria. For example, if a diverse circuit 36 is assigned a card in a particular mounting position, diversity engine 12 may traverse the applicable equipment hierarchy (e.g., mounting position, mounting apparatus, switching system) to determine whether the diversity rules 16 applicable to the circuit 36 have been satisfied.

In one embodiment, similar to diverse rider indicators described above with respect to facility and plant assignments, a diverse rider indicator may be associated with equipment as it is assigned to a diverse circuit 36. In response, the equipment hierarchy may be traversed and a corresponding indicator may be associated with higher level equipment that is a parent to the assigned equipment. As a result, if equipment having parent equipment is assigned to a first diverse circuit 36, diversity engine 12 may be able to avoid assigning other equipment having the same parent equipment to a second diverse circuit 36 in the same diversity set 14. The indicator associated with the parent equipment may explicitly identify the first diverse circuit 36 or may simply provide an appropriate warning that further investigation is needed before assigning equipment with that parent to a second diverse circuit 36. Similarly, diverse rider indicators may be used to avoid assigning certain equipment at the same level in the equipment hierarchy to diverse circuits 36 in the same diversity set 14. As an example, when a diverse circuit 36 is assigned a card in a mounting position, the assigned card in the mounting position and the card in its complementary mounting position may each receive a diverse circuit rider indicator.

Equipment specifications may identify certain properties and functionality of particular makes, models, or other types (as opposed to pieces) of equipment. As an example only and not by way of limitation, the user 20 might define or otherwise provide to diversity engine 12 some equipment specifications for "channel banks" generally or for particular makes and models of channel banks. Diversity rules 16 may be defined based on these equipment specifications and applied in the design of diverse circuits 36 when equipment of those types is being assigned. Similar to an equipment hierarchy for individual pieces of equipment, equipment types might be incorporated in an appropriate equipment hierarchy, equipment assignments being made according to the diversity rules 16, relative susceptibility levels, or any other criteria. For example, if a diverse circuit 36 is assigned a certain type of mounting apparatus, diversity engine 12 may traverse the applicable equipment hierarchy to determine whether diversity rules 16 applying to circuit 36 are satisfied. Diversity rules 16 founded on equipment type may be particularly useful in connection with electronic diversity rules 16 associated with power sources, timing sources, or other critical electronic components, as described more fully below.

In one embodiment, assignment of a particular piece or type of equipment might require avoidance of another assignment, or might require a complementary assignment, for purposes of diversity. As an example of avoidance, a diversity rule 16 might specify that when assigning a diverse circuit 36 to any channel bank, the first and twenty-fourth channel units (slots) should be avoided. Alternatively, for a complementary assignment, a diversity rule 16 might specify that when assigning a diverse circuit 36 to an SS7 link port of a particular make and model of switching system, if a first circuit has already been assigned the "Group 00 Member 01" link port, a complementary assignment of a second diverse circuit 36 should be made to the "Group 32 Member 01" link port. This may reflect the fact that, at least for the particular make and model, the manufacturer has engineered these link ports to be diverse. Diversity rules 16 may specify avoidance or complementary assignments with respect to any suitable aspect of physical equipment.

In one embodiment, exemplary diversity rules 16 for office repeaters, Digital Signal Cross-Connect (DSX) panels, patch bays, or any other suitable equipment might specify SS7 A, C, E, and F-link diversity at a bay or other appropriate level while specifying SS7 B and D-link triversity at the same level. The capability to specify, as an example, a bay as requiring diversity or triversity in certain cases but not in others may be provided using diversity rules 16 associated with an equipment specification for a lower level in the applicable equipment hierarchy. A DSX panel might have a high susceptibility level or other warning for itself and its parent bay. However, the equipment specification for the parent bay might not have a diversity rule 16 directly associated with it, since the equipment that is being assigned and is installed in the bay (in this case, the DSX panel) may already have the diversity rule 16 applied to it.

Exemplary diversity rules 16 for Digital Cross-Connect Systems (DCS) may specify that SS7 A, C, E, and F-links in the same diversity set 14 not be assigned to facilities 34 terminating on the same DCS, and that SS7 B and D-links in the same diversity set 14 may have two of four quad links assigned to the same DCS where each link is assigned to a separate shelf.

Exemplary diversity rules 16 for channel banks might specify that when SS7 A, C, E, and F-link pairs within the same diversity set 14 must both terminate in a channel bank (i.e. there is no DCS at the particular location 32), then the channel banks should be D4 Extended Superframe Format (ESF) channel banks mounted in separate bays. Similarly, the diversity rules 16 may specify that if SS7 B and D-link quads in the same diversity set 14 must terminate in the same channel bank, three of the four links should terminate in D4 ESF channel banks mounted in separate bays. Diversity engine 12 might allow the user 20 to override such diversity rules 16, for example, if user 20 has determined manually or otherwise that the channel banks are powered and fused independently from one another.

Exemplary diversity rules 16 for fiber optic terminals and multiplexers may specify that SS7 A, C, E, and F-link pairs in the same diversity set 14 should be assigned separate fiber optic terminals and separate multiplexers where possible. If not possible, the links should be assigned to T1s that terminate on separate low speed cards. Similarly, diversity rules 16 may specify that SS7 B and D-link quads in the same diversity set 14 should have three of four links assigned to separate fiber optic terminals and separate multiplexers when possible. If this is not possible, at least three of four links should be assigned to separate low speed cards.

Exemplary diversity rules 16 for test access equipment may specify that SS7 A, C, E, and F-link pairs in the same diversity set 14 should be assigned to separate test access units, while SS7 B and D-link quads in the same diversity set 14 should have three of the four links assigned to separate test access units.

Exemplary diversity rules 16 for SS7 link interface cards may specify that if a card has the ability to handle more than one link, links with common or equivalent destinations should be handled by different cards. Other diversity rules 16 might specify that SS7 A, C, E, and F-link pairs within the same diversity set 14 should terminate at different link interface equipment, while SS7 B and D-link quads in the same diversity set 14 should have three of four links terminating at different link interface equipment. If there are multiple layers of SS7 links originating from the same location 32, these layers should be assigned to different STP link termination frames and to different units within those frames.

Electronic diversity involves ensuring that diverse circuits 36 have diverse assignments for certain critical electronic components, for example, power sources, timing sources, or other components. In one embodiment, this might encompass the identification of primary and secondary power and timing feeds from components such as power boards, fuse panels, and Building Integrated Timing Supply (BITS) equipment. Positions of such components in a bay or another structure of assigned equipment may be important in avoiding common points of failure between diverse circuits 36 that rely on the components. Avoidance and complementary assignment considerations described above may be applicable. In general, electronic diversity may be considered a subset of equipment diversity.

Exemplary diversity rules 16 regarding power sources might specify that SS7 A, C, E, and F-link pairs in the same diversity set 14 should be assigned to different power buses where possible. If multiple layers of SS7 links originate from the same piece of equipment or location 32, the layers should be assigned to different power buses. For locations 32 having more than one power distribution frame, these bus assignments should be spread over separate frames. Other candidates for diversity rules 16 in this area might include, without limitation, modem shelf power supplies and power module options. On a larger scale, diversity engine 12 may be able to apply diversity rules 16 specifying that selected locations 32, such as STP sites, rely on different AC power grids.

Where channel banks are used, exemplary diversity rules 16 regarding timing sources may specify that SS7 A, C, E, and F-link pairs in the same diversity set 14 should be assigned separate channel banks having dedicated composite clock leads from the BITS equipment. If possible, the assignments should be made to channel banks that have two separate circuit packs for the BITS clock source. Even more preferably, the assignments should be made to channel banks that are clocked from two different shelves. SS7 B and D-link quads in the same diversity set 14 might be subject to the same or substantially similar diversity rules 16.

In one embodiment, diversity engine 12 may attempt to apply as many of these or any other appropriate diversity rules 16 as possible when assigning equipment or electronic components to diverse circuits 36. The diversity engine 12 may support diversity validation through some relationship between circuits 36 and the network provider's inventory. If detail is insufficient to automatically implement certain of these diversity rules 16 (e.g., power source inventory is not maintained), then the diversity engine 12 or another component of system 10 may generate checklists for use in manually verifying that these diversity rules 16 are satisfied or, if not, that violations are flagged for possible remediation. User 20 may be allowed to secure equipment inventory for future assignment using a suitable reservation process. The present invention contemplates any suitable diversity rules 16 to identify and enforce diversity requirements for equipment and related diversity.

Figure 8:
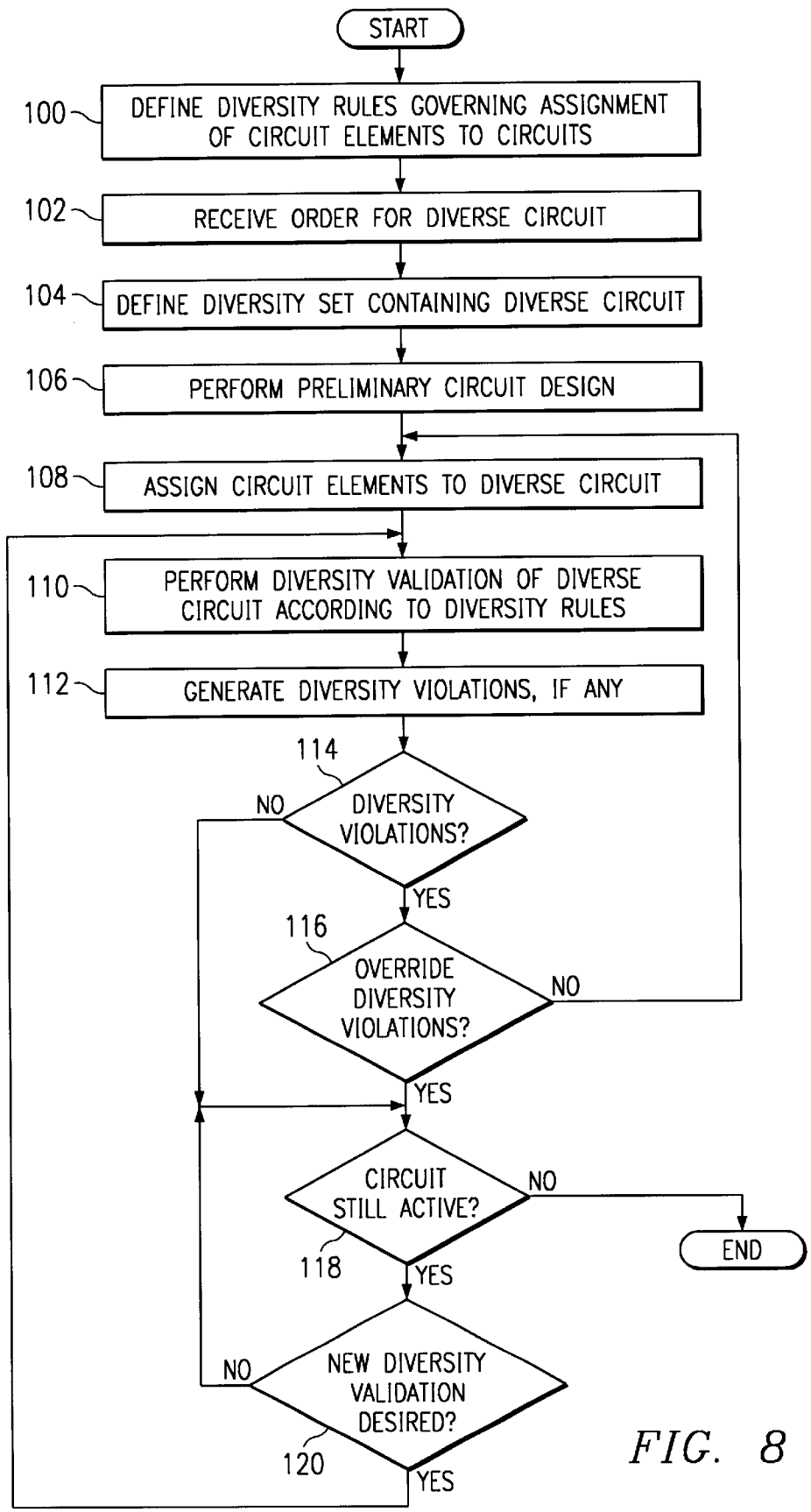
FIG. 8 illustrates an exemplary method of designing diverse circuits.

FIG. 8 illustrates an exemplary method for designing diverse circuits 36. The method begins at step 100, where user 20 defines one or more diversity rules 16 associated with at least some assignments of facilities, plant, equipment, electronic components, and other circuit elements that may be made to diverse circuits 36. As described above, diversity rules 16 may encompass any appropriate diversity types and be defined in any appropriate order. For example, diversity rules 16 for facility assignment might be defined first, diversity rules 16 for physical plant assignment might be defined second, and so forth. Alternatively, these diversity rules 16 might be interleaved in some suitable manner with respect to their order of definition. The diversity rules 16 may be changed, added to, deleted from, or otherwise modified in any appropriate manner and at any appropriate time.

At step 102, before, during, or after the definition of one or more diversity rules 16, an order for a diverse circuit 36 is received. As just an example, the order might be associated with a service request from a customer of the network provider for an SS7 link pair requiring diversity. At step 104, user 20 defines one or more diversity sets 14 containing this and any other suitable diverse circuits 36. At step 106, user 20 may manually perform preliminary design of the diverse circuit 36 according to the order and the one or more applicable diversity rules 16. In one embodiment, preliminary design might only be warranted where the user 20 can readily narrow the available assignments, where a particular assignment is required even though the assignment is likely to result in one or more diversity violations 18, or where the user 20 knows in advance that diversity engine 12 will be unable to automatically validate circuit 36 against certain diversity rules 16 (e.g., because the network provider does not maintain the necessary inventory). As described above, user 20 may use one or more checklists generated using diversity engine 12 or otherwise. Although substantially automatic design is generally preferable, manual design processes may wholly or partially replace or be integrated with automatic design processes according to particular needs.

User 20, diversity engine 12, or any other component of system 10 assigns circuit elements to the diverse circuit 36 at step 108 as part of the circuit design process. As described above, the assignments may be made automatically as part of an automatic circuit design process such as that described in U.S. application Ser. No. 09/736,902. At step 110, diversity engine 12 performs a diversity validation with respect to diverse circuit 36 according to one or more applicable diversity rules 16 and, at step 112, may generate one or more diversity violations 18 as appropriate. If no diversity violations 18 exist at step 114, the design of diverse circuit 36 may be considered complete from an assignment perspective. If one or more diversity violations 18 exist at step 114, and user 20 both chooses to and is permitted to override the diversity violations 18 at step 116, the design may also be considered complete from an assignment perspective. However, if user 20 either chooses not to or is prohibited from overriding one or more diversity violations 18, the method returns to step 108 for one or more alternative assignments. The method may repeat in this manner until, at step 114, no diversity violations 18 exist or all existing diversity violations 18 have been overridden and, preferably, appropriately flagged for subsequent remediation.

In one embodiment, diversity validations may occur at multiple points in the life cycle of the diverse circuit 36. For example, diversity validations may occur during initial design of circuit 36, during re-design of circuit 36, in connection with maintenance that affects one or more circuit elements already assigned to circuit 36, in response to one or more other circuit elements becoming available for assignment to circuit 36, according to a predetermined circuit grooming schedule, or at any other appropriate time. Diversity validations may be scheduled, triggered in response to a specified event or condition, or performed on an ad hoc basis. Supporting diversity validations at a variety of points during the circuit life cycle helps system 10 better support the ongoing goal of reducing or eliminating common points of failure and thereby improving the reliability and performance of the network.

It is preferable to perform a diversity validation whenever an activity occurs that may affect one or more circuit elements assigned to diverse circuit 36. For example, if assignment of circuit elements to diverse circuit 36 results in diversity violations 18 that are allowed to remain unresolved, the diversity violations 18 will preferably be captured and flagged for later remediation. If any other assignments later become available, due to other circuits becoming inactive and releasing their assignments, new circuit elements being made available, or for any other suitable reason, re-assignment and re-validation might be warranted. It will preferably be possible for the user 20, diversity engine 12, or both to periodically or otherwise review the availability of circuit elements sufficient to place diverse circuit 36 in compliance with any or all previously violated diversity rules 16. As a converse example, a routine or other circuit grooming procedure may cause diverse circuit 36 to violate one or more diversity rules 16 that circuit 36 previously satisfied. Such occurrences should be identified and resolved when possible through appropriately-timed diversity validations.

In one embodiment, while diverse circuit 36 remains active or otherwise of interest to the network provider at step 118, diversity validations remain available at any appropriate time. If a new diversity validation is desired at step 120, the method returns to steps 110 (or first to step 108 if one or more new assignments are to be made), where diversity engine 12 performs the diversity validation. If the diverse circuit 36 is no longer active at step 118, the method ends. Although the method is described as being performed with respect to all the assignments to diverse circuit 36, the present invention contemplates the method being performed with respect to any subset of assignments. For example, the method may be performed with respect to selected facility assignments and then subsequently performed with respect to other facility assignments. Similarly, the method might be performed with respect to some or all facility assignments and then subsequently performed with respect to some or all plant, equipment, or any other desired assignments.

Although the present invention has been described with several embodiments, a plethora of changes, substitutions, variations, alterations, and modifications may be suggested to one skilled in the art, and it is intended that the invention encompass all such changes, substitutions, variations, alterations, and modifications as fall within the spirit and scope of the appended claims.

What is claimed is:

1. A system for designing diverse communications circuits, comprising:
a diversity set identifying at least one circuit that is to be diverse from one or more other circuits in the diversity set;
one or more diversity rules applicable to one or more circuits in the diversity set; and
a diversity engine operable to validate an assignment of at least one circuit element to a circuit in the diversity set, according to the diversity rules, such that the circuit is diverse from at least one other circuit in the diversity set with respect to the circuit element.

2. The system of claim 1, wherein the diversity engine is further operable to automatically assign at least one circuit element to each circuit in the diversity set, according to the diversity rules, such that all the circuits in the diversity set are diverse from one another with respect to the assigned circuit elements.

3. The system of claim 1, wherein:
the circuits in the diversity set comprise SS7 links; and
at least one circuit in the diversity set is excluded from the diversity rules, such that the excluded circuit need not be diverse from other circuits in the diversity set.

4. The system of claim 1, wherein the circuit element is a member of a hierarchy and the diversity engine is operable to validate the assignment of the circuit element according to a position of the circuit element in the hierarchy and a position in the hierarchy at which a common point of failure is shared between the circuit element and another circuit element.

5. The system of claim 4, wherein the hierarchy is selected from a group consisting of:
a facility hierarchy;
a plant hierarchy; and
an equipment hierarchy.

6. The system of claim 1, wherein the circuit element is selected from a group consisting of:
a facility or facility type;
a location or location type;
a plant element or plant element type;
an environment;
a piece of equipment or an equipment type; and
an electronic component or component type.

7. The system of claim 1, wherein the diversity engine is operable to validate the assignment of the circuit element in connection with initial design of the circuit, re-design of the circuit, or maintenance affecting the circuit.

8. The system of claim 1, wherein the system allows the user to modify the diversity set after the validation of the assignment of the circuit element, the diversity engine further operable to re-validate the assignment of the circuit element in response to modification of the diversity set.

9. The system of claim 1, wherein the system allows a user to modify the diversity rules after the validation of the assignment of the circuit element, the diversity engine further operable to re-validate the assignment of the circuit element in response to modification of the diversity rules.

10. The system of claim 1, wherein the diversity engine is further operable to re-validate the assignment of the circuit element in response to a modification associated with the circuit element or another circuit element becoming available for assignment.

11. The system of claim 1, wherein the diversity engine is further operable to:
generate one or more diversity violations if assignment of the circuit element fails to comply with the diversity rules; and
associate the diversity violations with the circuit and with its diversity set to indicate a possible need to modify the assignment.

12. The system of claim 11, wherein the diversity engine is operable to allow a user to override a diversity violation based on its severity and on a security profile associated with the user.

13. The system of claim 1, wherein the diversity engine is operable to automatically as sign t he circuit element during design of the circuit in response to a user specifying endpoints of the circuit.

14. A system for designing diverse communications circuits, comprising:
a diversity set identifying at least one circuit that is to be diverse from one or more other circuits in the diversity set;
one or more diversity rules applicable to one or more circuits in the diversity set; and
a diversity engine operable to:
validate assignment of at least one circuit element in a hierarchy to a circuit in the diversity set based on particular diversity rules selected according to a position of the circuit element in the hierarchy and a position in the hierarchy at which a common point of failure is shared between the circuit element and another circuit element, such that the circuit is diverse from at least one other circuit in the diversity set with respect to the circuit element;
generate one or more diversity violations if assignment of the circuit element to the circuit fails to comply with one or more diversity rules;
associate the diversity violations with the circuit and with its diversity set to indicate a possible need to modify the assignment of the circuit element to the circuit; and
allow a user to override a diversity violation based on its severity and on a security profile associated with the user.

15. A system for designing diverse communications circuits, comprising:
means for accessing a diversity set identifying at least one circuit that is to be diverse from one or more other circuits in the diversity set;
means for accessing one or more diversity rules applicable to one or more circuits in the diversity set; and
means for validating assignment of at least one circuit element to a circuit in the diversity set, according to the diversity rules, such that the circuit is diverse from at least one other circuit in the diversity set with respect to the circuit element.

16. A software interface for designing diverse communications circuits, the software interface operable to:
provide access to a diversity set identifying at least one circuit that is to be diverse from one or more other circuits in the diversity set;
provide access to one or more diversity rules applicable to one or more circuits in the diversity set; and
in response to user input, initiate automatic validation of an assignment of at least one circuit element to a circuit in the diversity set, according to the diversity rules, such that the circuit is diverse from at least one other circuit in the diversity set with respect to the circuit element.

17. The interface of claim 16, further operable, in response to user input, to initiate assignment of at least one circuit element to each circuit in the diversity set, according to the diversity rules, such that all the circuits in the diversity set are diverse from one another with respect to the assigned circuit elements.

18. The interface of claim 16, wherein:
the circuits in the diversity set comprise SS7 links; and
the interface allows the user to exclude at least one circuit in the diversity set from the diversity rules, such that the excluded circuit need not be diverse from other circuits in the diversity set.

19. The interface of claim 16, wherein:
the circuit element is a member of a hierarchy; and
the validation of the assignment is performed according to a position of the circuit element in the hierarchy and a position in the hierarchy at which a common point of failure is shared between the circuit element and another circuit element.

20. The interface of claim 19, wherein the hierarchy is selected from a group consisting of:
a facility hierarchy;
a plant hierarchy; and
an equipment hierarchy.

21. The interface of claim 16, wherein the circuit element is selected from a group consisting of:
a facility or facility type;
a location or location type;
a plant element or plant element type;
an environment;
a piece of equipment or an equipment type; and
an electronic component or component type.

22. The interface of claim 16, wherein validation of the assignment is initiated in connection with initial design of the circuit, re-design of the circuit, or maintenance affecting the circuit.

23. The interface of claim 16, further operable to:
allow the user to modify the diversity set after the assignment of the circuit element; and
initiate a re-validation of the assignment in response to modification of the diversity set.

24. The interface of claim 16, further operable to:
allow the user to modify the diversity rules after assignment of the circuit element; and
initiate a re-validation of the assignment in response to modification of the diversity rules.

25. The interface of claim 16, further operable to initiate, in response to user input, re-validation of the assignment in response to a modification associated with the circuit element or another circuit element becoming available for assignment to the circuit.

26. The interface of claim 16, further operable to:
indicate to the user one or more diversity violations if the assignment of the circuit element fails to comply with the diversity rules; and
indicate association of the diversity violations with the circuit and its diversity set to indicate a possible need to modify the assignment.

27. The interface of claim 26, further operable to:

receive security information from the user; and allow the user to override a diversity violation based on its severity and the security profile associated with the user.

28. The interface of claim 16, further operable to:

receive endpoints of the circuit from the user; and in response to receiving the endpoints, initiate an automatic assignment of the circuit element during design of the circuit.

29. A method for designing diverse communications circuits, comprising:

accessing a diversity set identifying at least one circuit that is to be diverse from one or more other circuits in the diversity set;

accessing one or more diversity rules applicable to one or more circuits in the diversity set; and validating assignment of at least one circuit element to a circuit in the diversity set, according to the diversity rules, such that the circuit is diverse from at least one other circuit in the diversity set with respect to the circuit element.

30. The method of claim 29, further comprising assigning at least one circuit element to each circuit in the diversity set, according to the diversity rules, such that all the circuits in the diversity set are diverse from one another with respect to the assigned circuit elements.

31. The method of claim 29, wherein:

the circuits in the diversity set comprise SS7 links; and at least one circuit in the diversity set is excluded from the diversity rules, such that the excluded circuit need not be diverse from other circuits in the diversity set.

32. The method of claim 29, wherein:

the circuit element is a member of a hierarchy; and the assignment of the circuit element is validated according to a position of the circuit element in the hierarchy and a position in the hierarchy at which a common point of failure is shared between the circuit element and another circuit element.

33. The method of claim 32, wherein the hierarchy is selected from a group consisting of:

a facility hierarchy;

a plant hierarchy; and an equipment hierarchy.

34. The method of claim 29, wherein the circuit element is selected from a group consisting of:

a facility or facility type;

a location or location type;

a plant element or plant element type;

an environment;

a piece of equipment or an equipment type; and an electronic component or component type.

35. The method of claim 29, wherein assignment of the circuit element is validated in connection with initial design of the circuit, re-design of the circuit, or maintenance affecting the circuit.

36. The method of claim 29, further comprising:

allowing a user to modify the diversity set after the assignment of the circuit element; and re-validating the assignment of the circuit element in response to modification of the diversity set.

37. The method of claim 29, further comprising:

allowing a user to modify the diversity rules after assignment of the circuit element; and re-validating the assignment of the circuit element in response to modification of the diversity rules.

38. The method of claim 29, further comprising re-validating assignment of the circuit element in response to either a modification associated with the circuit element or another circuit element becoming available for assignment.

39. The method of claim 29, further comprising:

generating one or more diversity violations if the assignment of the circuit element fails to comply with the diversity rules; and associating the diversity violations with the circuit and with its diversity set to indicate a possible need to modify the assignment.

40. The method of claim 39, further comprising allowing a user to override a diversity violation based on its severity and a security profile associated with the user.

41. The method of claim 29, further comprising assigning the circuit element automatically during design of the circuit in response to a user specifying endpoints of the circuit.

42. A method for designing diverse communications circuits, comprising:

accessing a diversity set identifying at least one circuit that is to be diverse from one or more other circuits in the diversity set;

accessing one or more diversity rules applicable to one or more circuits in the diversity set; and validating assignment of at least one circuit element within a hierarchy to a circuit in the diversity set based on particular diversity rules selected according to a position of the circuit element in the hierarchy and a position in the hierarchy at which a common point of failure is shared between the circuit element and another circuit element, such that the circuit is diverse from at least one other circuit in the diversity set with respect to the circuit element;

generating one or more diversity violations if the assignment of the circuit element to the circuit fails to comply with one or more diversity rules;

associating the diversity violations with the circuit and with its diversity set to indicate a possible need to modify the assignment of the circuit element to the circuit; and allowing a user to override a diversity violation based on its severity and on a security profile associated with the user.

\* \* \* \* \*